Nov. 5, 1940.  J. J. MUNSON ET AL  2,220,793
MACHINE FOR CUTTING SUGAR CANE AND THE LIKE
Filed April 10, 1939  3 Sheets-Sheet 1
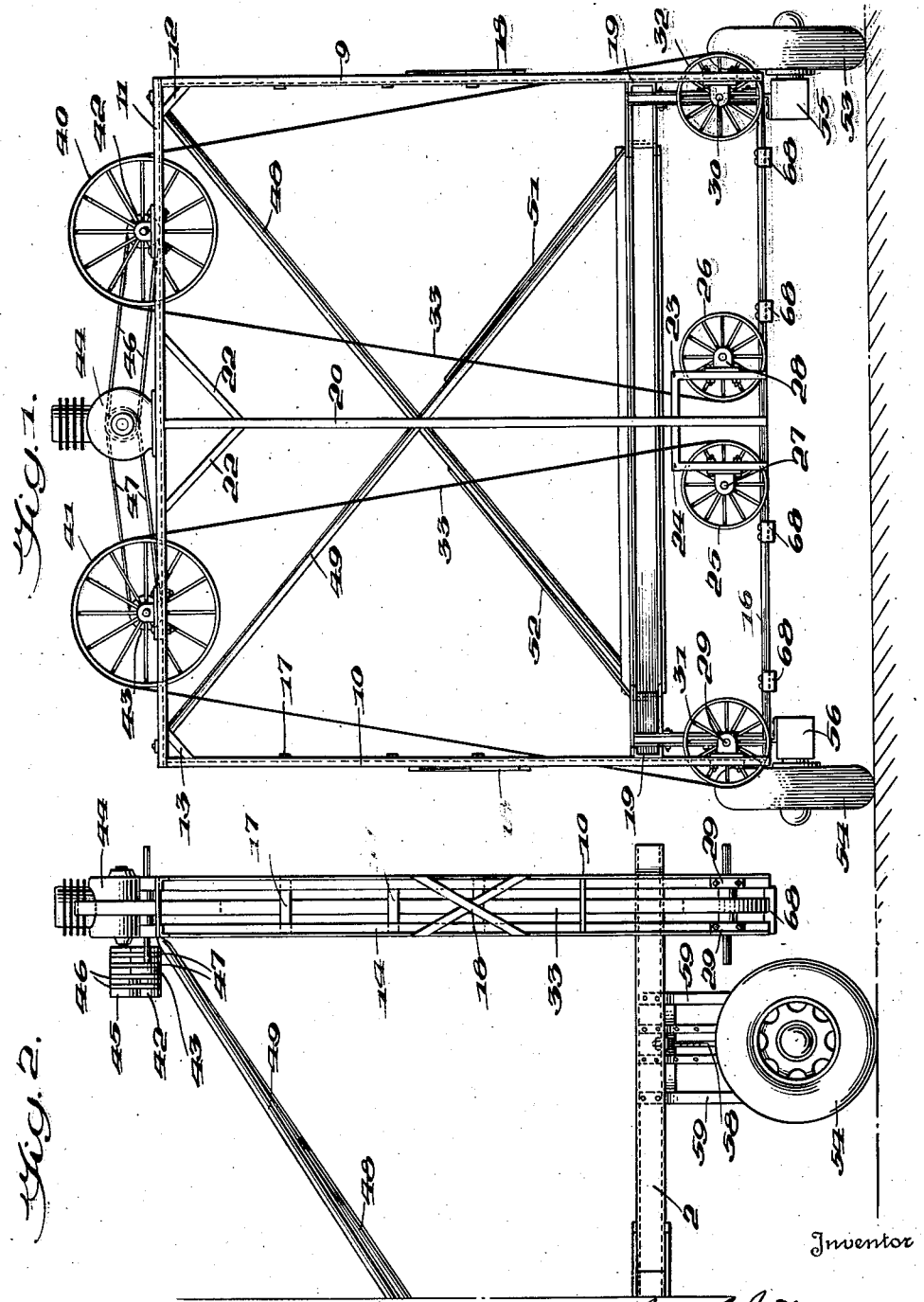
Inventor
Joseph J. Munson &
Byron C. Thomson,
By Smith, Michael & Gardner,
Attorneys.

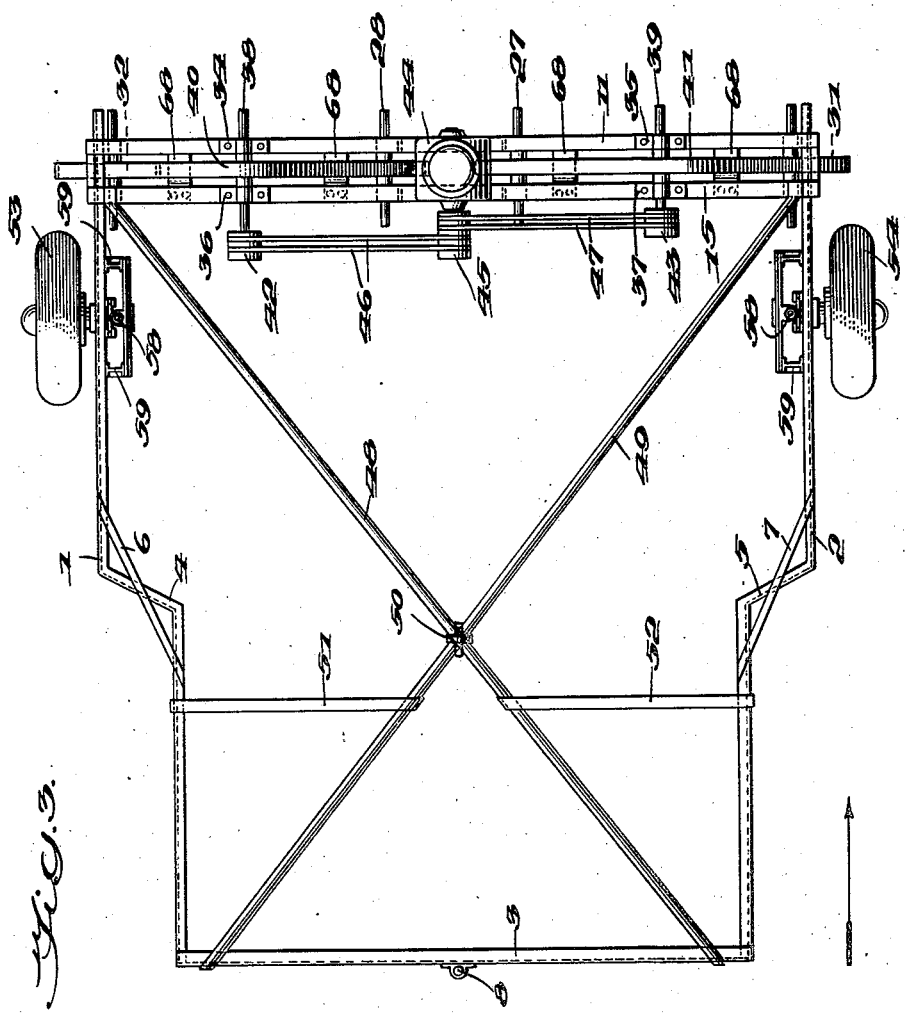

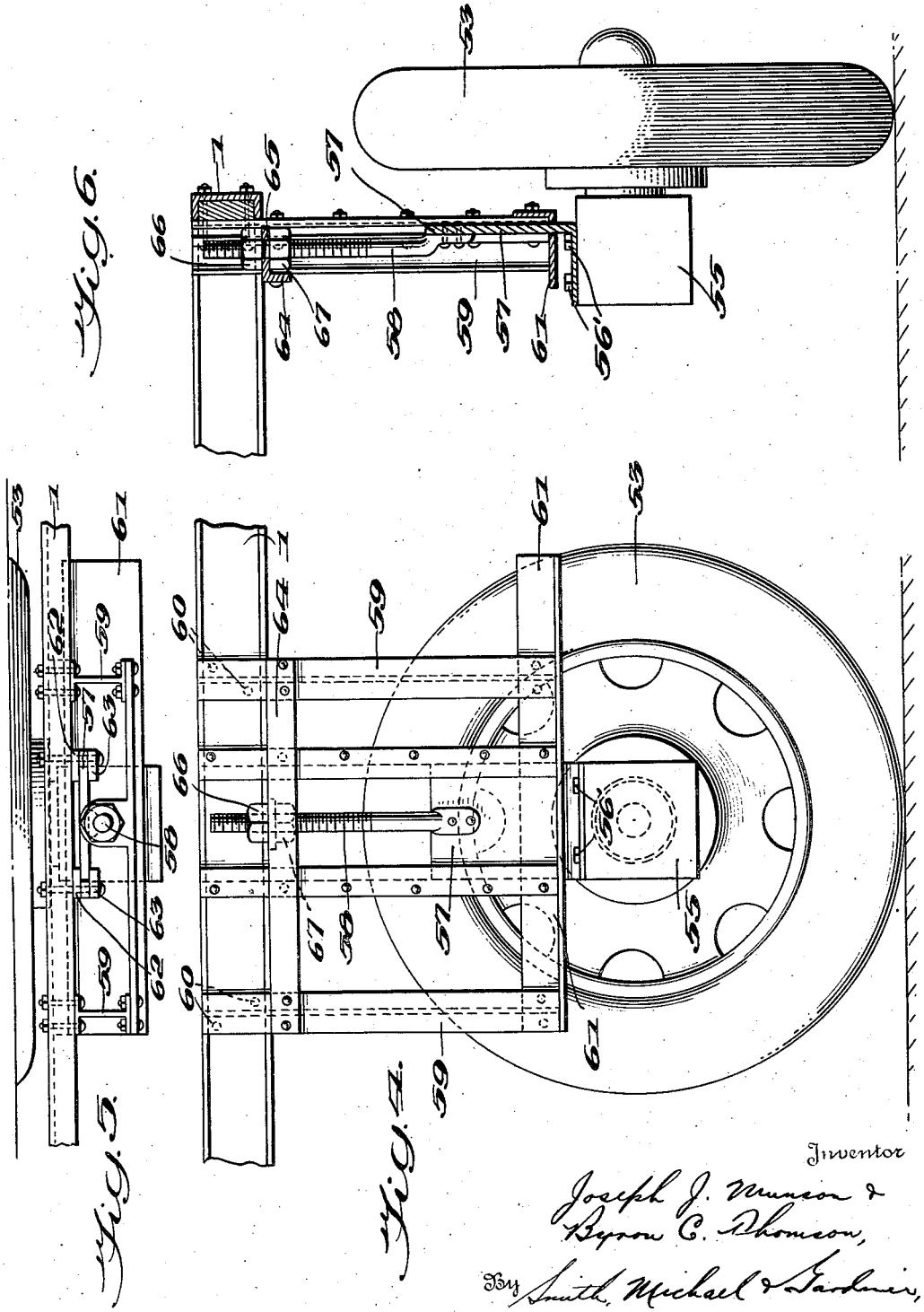

Patented Nov. 5, 1940

2,220,793

UNITED STATES PATENT OFFICE 2,220,793

MACHINE FOR CUTTING SUGAR CANE AND THE LIKE

Joseph Jones Munson, Houma, and Byron C. Thomson, Labadieville, La.

Application April 10, 1939, Serial No. 267,094

6 Claims. (Cl. 56—15)

This invention relates to a machine for cutting sugar cane or the like.

Sugar cane is ordinarily planted in rows approximately six feet apart and at the end of the cultivating season it is found that the rows are approximately a foot higher than the "middle" or furrow between the rows.

The present machine is designed to straddle one or more rows of cane and to be guided down the furrows.

The machine consists of a frame which is of sufficient height to pass over the cane and is provided with cutters for severing the cane from the stalk at a point adjacent the top of the row, the height of the frame permitting the cane to fall rearwardly in the row and thus preserve the principle of cutting cane by hand as now employed.

One of the objects of the present invention is to provide a machine having a cutter that is power driven, the cutter being of the type that will readily sever the cane and prevent damage to the roots of the cane or to the stalk as cut.

A further object of the invention is to utilize a continuous narrow flexible ribbon-like cutter driven at sufficiently high speed to prevent injury to the cane after it is cut.

Another object of the invention is to provide means for driving the cutter elements and to so locate the driving means that it has free access to the air for purposes of cooling.

An additional object is the provision of means for adjusting the frame, and consequently the cutters, with reference to the ground level so that the cutter will sever the cane as close to the ground as possible, it being understood that the richest juice is at the bottom of the stalk, and it also being desirable to prevent the remaining stalk from projecting from the ground because of the fact that the root is left in the ground to come up a second year as stubble cane, and this root turns sour if exposed to weather so that the stubble cane is injured.

Other objects and advantages will be apparent as the description proceeds, it being understood that while the present embodiment discloses a machine for cutting two rows of cane, it is within the purview of this invention to cut one or more rows in the same manner.

In the drawings:

Figure 1 is a front elevation of the present invention.

Fig. 2 is a fragmentary side elevation.

Fig. 3 is a plan view.

Fig. 4 is a side elevation of the means for adjusting the height of the cutter.

Fig. 5 is a plan view of Fig. 4, and

Fig. 6 is a vertical section of Fig. 4.

The present machine consists of a horizontal U-shaped frame consisting of legs 1 and 2 which are substantially parallel to each other, and an end frame 3 connecting the rear ends of the frames 1 and 2.

Offsets 4 and 5 are provided in order to narrow the rear end of the machine, and braces 6 and 7 extend across the offsets 5 and 6 in order to strengthen the frame.

It will be noted from the construction just described that the horizontal frame is of U-shape with the mouth of the U extending in the direction of forward motion of the machine, the machine being propelled in the direction shown by the arrow in Fig. 3.

The end frame 3 is provided with a suitable coupling device 8 by means of which the machine may be attached to any suitable mechanism for propelling the same or, if desired, the frame may be pushed by mules as is quite common.

At the forward end of the horizontal frame comprising the members 1, 2 and 3 there is provided a vertical U-shaped frame comprising parallel legs 9 and 10 and a top frame 11 connecting the upper ends of the legs 9 and 10. Braces 12 and 13 are provided at the corners of the frame for strengthening purposes.

Immediately to the rear of the vertically extending frame indicated at 9, 10 and 11, is a supplemental frame which is of rectangular formation and comprises parallel side members 14, a top member 15 and a bottom member 16 connecting the lower ends of the side members 14, it being understood that as viewed in Fig. 2 there is a member corresponding to 14 on the opposite side of the machine.

The two vertically extending frames are held in spaced relation by spreaders 17 and are strengthened by cross struts 18.

The vertically extending frames are secured to the legs 1 and 2 of the horizontal frame at points intermediate the height of the vertical frames as indicated at 19, so that the lower ends of the spaced vertical frames project below the horizontal frame consisting of the legs 1 and 2 and the rear connecting member 3.

The purpose of the spaced vertical frames is to provide means for supporting a continuous or endless narrow ribbon-like, flexible cutter in such position that it may cut the cane as close to the ground as possible.

Depending from approximately the center of the vertical frames are a pair of arms, one of which is indicated at 20 in Fig. 1 and is connected to the top element 11 by means of braces 22, it being understood that a similar arm is secured to the supplemental rectangular frame comprising the elements 14, 15 and 16.

The arm 20 extends downwardly to approximately the same extent as the side legs of the vertical frames and has provided at its lower ends brackets 23 and 24 secured thereto.

Pulleys 25 and 26 are secured to the brackets 23 and 24, respectively, by means of bearings 27 and 28.

The vertical legs of the two vertically extending frames carry bearings 29 and 30 at the lower end thereof in which are journalled pulleys 31 and 32, it being noted that each pair of pulleys lying between the central arm 20 and the side frames, is arranged in substantially the same plane so that the lower run of the cutters 33 which are trained thereover lie substantially parallel to the ground.

The top rails of the vertical frames are provided with bearings 34, 35, 36 and 37 for the reception of shafts 38 and 39 carrying pulleys 40 and 41.

It is to be understood that the pulleys 40 and 41 may be adjusted vertically by any known means in order to place the cutters 33 under sufficient tension, and also laterally in order to tighten the drive belts.

On the rear ends of the shafts 38 and 39 for the upper pulleys 40 and 41 there are provided pulleys 42 and 43 by means of which the cutters 33 are driven.

Situated on the top rails 11 and 15 of the two vertically extending frames is a motor 44 which is here indicated as being a gasoline motor but which may be an electric or other suitable type of motor.

A pulley 45 is carried by the crank shaft of the motor and the upper pulleys 40 and 41 are driven from the pulley 45 by means of belts or chains 46 and 47.

From the foregoing it will be seen that the construction thus far described provides means for supporting the cutters in such manner that as the machine is pushed forwardly and the cutters driven at a sufficiently high rate of speed, the cane will be severed quickly and close to the ground and without injury to the stalk or root, it being understood that the cutter may be provided with a smooth cutting edge or a saw tooth edge but it is essential that it be driven at fairly high speed in order to eliminate damage to the cane as cut.

The spaced vertically extending frames are maintained in their upright position by means of the cross struts 48 and 49 which are united by means of suitable connecting means as at 50, it being seen from Figs. 2 and 3 that the struts 48 and 49 are connected to the top of the vertical frames and extend diagonally downwardly for connection with the end member 3 of the horizontal frame.

Additional strengthening means is provided in the struts 51 and 52 connecting the legs 1 and 2 of the horizontal frame with the cross struts 48 and 49.

In order that the cutters may be adjusted to accommodate different heights of rows, the frame is supported on wheels 53 and 54 which may be equipped with pneumatic tires, and the wheels are journaled in boxes 55 and 56, respectively.

The adjustment for both wheels is exactly the same and a description of one will suffice for the other.

Referring to Figs. 4, 5 and 6, the box 55 has attached thereto by bolts 56' a vertically extending plate 57 and secured to the upper end of the plate 57 is a screw 58.

The horizontal frame carries a rectangular bracket comprising side arms 59 secured to the frame 1 by means of suitable rivets indicated at 60, and also comprises the cross-member 61.

Likewise secured to the frame 1 are suitable vertically extending guides composed of spaced plates 62 and 63 and in which the plate 57 is adapted to slide.

Extending transversely of the bracket comprising the side members 59 and bottom member 61 is a support 64 provided with an opening 65 through which the screw 68 extends. The screw 58 carries nuts 66 and 67 located, respectively, above and below the support 64.

From the foregoing it is obvious that the height of the frame can be adjusted by loosening one or the other of the nuts 66 and 67 and after the proper adjustment has been made, tightening of either of these nuts to clamp the support 64 therebetween will effectively locate the frame at the desired elevation above ground.

The motor is mounted on the top rails of the spaced vertical frames in order that it may have free access to air for cooling. If such motor were mounted down below the tops of the cane the circulation of air is impeded by the heavy growth of cane and it is found that the motors will overheat rapidly. By locating them at the point indicated the motor is above the cane and consequently receives the benefit of the air as the machine is moved.

In order that the cutters 33 will not ride off the pulleys the guides 68 are provided. These guides are similar to those employed as ordinary band saw guides and do not need further description.

The guides 68 are supported by the lower member 16 of the rectangular vertically extending frame as indicated in Fig. 2.

While no suitable means for propelling the machine has been shown, it is to be understood that it may be pushed by mules, as stated, or by tractor, or, if desired, suitable power driving means may be mounted on the frame and by means of conventional gearing impart drive to the wheels 53 and 54, or, if desired, the frame may be provided with rear wheels and driven thereby.

The cutters 33 which are trained over the two lower pulleys and the single upper pulley form substantially triangles which are of sufficient height to permit the cane as it is cut to fall rearwardly into the rows, it being noted that there are no obstructions which will prevent proper disposition of the cane after the cutting operation.

The frame structure is preferably made of angle iron or channel iron, but of course it is to be understood that any suitable material may be used, and while certain details have been shown and described, this invention is not to be limited thereby unless rendered necessary by the claims appended hereto.

What we claim as new and desire to secure by Letters Patent is:

1. A cane cutting machine comprising an inverted U-shaped frame of sufficient height to pass over the top of the cane to be cut, a pulley carried at the top of the frame, spaced pulleys carried at the bottom of said frame, and a flexible cutting band having a continuous cutting edge trained over said pulleys and extending horizontally between the spaced pulleys parallel with the ground whereby cane cut thereby may fall through said frame.

2. A cane cutting machine comprising an inverted U-shaped frame of greater height than the cane to be cut, a continuous flexible cutting band mounted on said frame, a motor for driving said cutter, said motor being mounted on top of said U-shaped frame.

3. A cane cutting machine comprising an inverted U-shaped frame divided by a depending central arm, pulleys carried by the frame adjacent the lower ends of the legs of the frame, pulleys carried by said depending arm on opposite sides thereof, and spaced pulleys carried by the top of said frame, flexible cutting bands having continuous cutting edges trained over said pulleys, each cutter being trained over one of the pulleys supported at the top of the frame and two of the pulleys at the lower end of the frame and means for driving said cutters, the cutting bands being spaced apart a distance substantially equal to the distance between the cane rows.

4. A cane cutting machine comprising a horizontal U-shaped frame with the opening between legs facing in the direction of motion of the machine, a vertically extending inverted U-shaped frame attached to the forward ends of the legs of the horizontal frame, pulleys carried by the vertical frame, flexible cutting bands having continuous cutting edges trained over said pulleys and means for driving said cutters.

5. A cane cutter comprising a horizontal U-shaped frame with the opening between legs facing in the direction of motion of the machine, a vertically extending inverted U-shaped frame attached to the forward ends of the legs of the horizontal frame, a supplemental vertically extending rectangular frame spaced rearwardly from the vertical inverted U-shaped frame and attached thereto, pulleys mounted in the space between said frames, and flexible cutters trained over said pulleys.

6. A cane cutter comprising a horizontal U-shaped frame with the opening between legs facing in the direction of motion of the machine, a vertically extending inverted U-shaped frame attached to the forward ends of the legs of the horizontal frame, a supplemental vertically extending rectangular frame spaced rearwardly from the vertical inverted U-shaped frame and attached thereto, pulleys mounted in the space between said frames, flexible cutters trained over said pulleys, and guides on the rectangular frame to prevent the cutters from riding off said pulleys.

JOSEPH JONES MUNSON.
BYRON C. THOMSON.